United States Patent [19]

Schmitt et al.

[11] 4,189,365

[45] Feb. 19, 1980

[54] PHOTOPOLYMERIZABLE COMPOSITIONS BASED ON ACRYLIC OR METHACRYLIC ACID ESTERS CONTAINING ORGANIC PHOSPHITES

[75] Inventors: Werner Schmitt; Robert Purrmann, both of Starnberg; Peter Jochum, Hechendorf, all of Fed. Rep. of Germany

[73] Assignee: ESPE Fabrik Pharmazeutischer Praparate GmbH, Fed. Rep. of Germany

[21] Appl. No.: 886,779

[22] Filed: Mar. 15, 1978

[30] Foreign Application Priority Data

Mar. 16, 1977 [CH] Switzerland ............... 003278/77

[51] Int. Cl.$^2$ ........................... C08F 2/46; C08F 4/00
[52] U.S. Cl. ........................... 204/159.23; 526/193; 204/159.18; 204/159.24; 260/42.52; 260/998.11; 433/228
[58] Field of Search ............... 204/159.18, 159.23, 204/159.24; 96/115 D

[56] References Cited

U.S. PATENT DOCUMENTS

| | | | |
|---|---|---|---|
| 3,699,022 | 10/1972 | Behrens et al. | 204/159.15 |
| 3,814,702 | 6/1974 | Bourdon et al. | 252/426 |
| 3,998,712 | 12/1976 | Hickmann et al. | 204/159.15 |

*Primary Examiner*—Richard B. Turer
*Attorney, Agent, or Firm*—Burns, Doane, Swecker & Mathis

[57] ABSTRACT

An improved photopolymerizable composition based on acrylic or methacrylic acid esters is disclosed. In addition to the mono- or polyfunctional acrylic or methacrylic acid ester compounds, an aliphatic, aromatic or mixed aliphatic-aromatic organic phosphite compound (in an amount of from about 0.1 to 20 percent by weight of the photopolymerizable ester compounds) and a monoketal of an aromatic 1,2-diketone compound (e.g., benzildimethylketal) are included as ultraviolet initiators to dramatically reduce the polymerization time of the composition without adversely affecting its stability.

10 Claims, No Drawings

PHOTOPOLYMERIZABLE COMPOSITIONS BASED ON ACRYLIC OR METHACRYLIC ACID ESTERS CONTAINING ORGANIC PHOSPHITES

BACKGROUND AND SUMMARY OF THE INVENTION

In accordance with our U.S. patent application Ser. No. 743,323, filed Nov. 19, 1976, now U.S. Pat. No. 4,116,788, it is possible to produce suitable masses based on acrylic ester compounds which can be polymerized by ultraviolet light and which contain mono- and/or polyfunctional acrylic or methacrylic ester compounds by the use of benzoin or benzoin derivatives acting as ultraviolet initiators, possibly also containing stabilizers and fillers, where aliphatic, aromatic or aliphatic-aromatic phosphites in a quantity ranging from 0.1 to 20 percent by weight, based on the acrylic ester compounds are present as activators for the ultraviolet polymerization. The phosphites are preferably used in these masses in a concentration of 0.1 to 2, and especially 0.2 to 1 percent by weight. The presence of the phosphites in concentrations as specified results in a strong activation of the initiating effect of the benzoin or its derivatives on the polymerization of the acrylic ester compounds by ultraviolet light.

It was found that this activation by the phosphites will occur also if monoketals of aromatic 1,2-diketone compounds, acting as ultraviolet initiators of the polymerization, are used. These monoacetals or -ketals of the 1,2-diketone compounds are per se known to act as initiators of the ultraviolet polymerization of various polymerizable masses. The published German application No. 22 32 365 characterizes the monoketals, especially of the aromatic diketones, such as benzil, as photo-initiators for the ultraviolet hardening of polyester resins. However, if these initiators are used, the radiation times needed for the hardening are quite extensive. In order to attain proper hardenings, radiation times lasting several minutes are required by the process disclosed by this German Offenlegungschrift No. 22 32 365.

The published German application No. 23 37 813 describes in detail a particularly suitable method for the production of these monoketals of aromatic 1,2-diketones and furthermore characterizes these compounds as means to sensitize the photopolymerization of polymerizable systems.

In accordance with the present invention, there is provided a photopolymerizable composition consisting essentially of acrylic or methacrylic acid esters which can be polymerized by ultraviolet light and which contains mono- or polyfunctional acrylic or methacrylic acid ester compounds and as ultraviolet initiators a monoketal of an aromatic 1,2-diketone compound and from about 0.1 to 20 percent by weight of the photopolymerizable ester compounds of an aliphatic, aromatic or mixed aliphatic-aromatic organic phosphite compound. Preferably, the monoketals are present in amounts of from about 0.05 to 20, most preferably from about 0.1 to 2, percent by weight of the photopolymerizable ester compounds.

The admixture of the aliphatic, aromatic, or mixed aliphatic-aromatic phosphites in a concentration of 0.1 to 20, and preferably 0.2 to 2.0, percent by weight of the photopolymerizable ester compounds and the monoketals of aromatic diketones, acting as ultraviolet sensitizers, as proposed by the present invention, will result in an activation of the polymerization which, in comparison with the polymerization attainable solely by the monoketals of the diketones, leads ordinarily to a two to five-fold acceleration. This greatly accelerating effect of the phosphites is particularly unexpected and surprising because it is stated in German Offenlegungschrifts Nos. 19 34 637 and 23 65 497, which are also concerned with polymerizable masses and the use of benzoin derivatives or monoketals of aromatic 1,2-diketones as photo-initiators, that phosphites, at a very weak concentration between 200 and 800 ppm, and also copper naphthenate or other phosphorus compounds such as triphenylphosphine or tributylphosphine, can be utilized in connection with this process as stabilizers to prevent an undesirable polymerization and for the purpose of increasing the stability during storage in the dark. In view of these circumstances a person skilled in the art had to assume that in the case of a polymerization system, containing monomers based on an acrylic acid and monoketals of the diketones as ultraviolet initiators, that these phosphites would have the effect of retarders rather than of activators of these systems.

DETAILED DESCRIPTION OF THE PREFERRED EMBODIMENTS

The monoketals of the diketones, especially the particularly suitable benzilketal compounds, proposed by the present invention to be admixed with the polymerizable masses, should be present in conventional concentrations, that is in amounts ranging from 0.05 to 20, and preferably 0.1 to 2 percent by weight of the photopolymerizable ester. In the benzilmonoketals used, one of the two carbonyl groups of the benzil is substituted acetal-like by a mono- or di-alcohol compound, where the two alkoxy radicals can be derived from like or unlike alcohols, in other words, either symmetrical or unsymmetrical acetals. If dialcohols such as glycol are used, cyclic ketal compounds, for example the benzilmonoethyleneketal, will be formed. However, the ketals of the monoalcohols having from 1 to 10 or more carbon atoms, for example the benzildimethylketal or the benzilmethylethylketal, are preferred. The ketals of the lower alcohols with 1 to 4 carbon atoms, that is, those with methoxy through butoxy radicals, are particularly effective.

Suitable phosphites are the compounds previously proposed to serve as activators for polymerizable masses. The following compounds are examples of phosphites to be used as activators in connection with the present invention: dimethylphosphite, dioctylphosphite, diphenylphosphite, tris-i-octylphosphite, tristearylphosphite, trimethylphosphite, triethylphosphite, tris-i-propylphosphite, trisallylphosphite, didecylphenylphosphite, triphenylphosphite, tris-4-nonylphenylphosphite and tris-4-chlorophenylphosphite. These masses may also contain initiators as well as fillers, provided they are absorbing only small amounts of ultraviolet light, such as silica powder or finely divided silicic acid or pulverized polyacrylate.

As in the case of the prior proposal set forth in our prior U.S. patent application Ser. No. 743,323, now U.S. Pat. No. 4,116,788, the disclosure of which is herein incorporated by reference, the new initiator system is particularly suitable for polymerizable masses containing di- or tri-functional acrylic or methacrylic acid derivatives, used primarily in the dental field for the manufacture of hardenable masses. Since the novel combination of diketoneketals and phosphite of 0.1 to 20 percent by weight makes it feasible to reduce very greatly the time of polymerization, and thus the hardening of the masses, with the aid of ultraviolet light emitters, the polymerizable masses, proposed by the invention, are particularly suitable in cases where masses are to be hardened in situ, that is inside the mouth of a patient.

It is very surprising that these polymerizable mixtures which due to the combination of phosphites with diketonemonoacetals are highly active and sensitive to ultraviolet rays possess a particularly advantageous stability to storage in the dark. Even the most reactive masses which will harden within 2 to 3 seconds when exposed to radiation, remained unchanged and stable after dark-storage for over one year, even at higher temperatures of approximately 50° C.

The invention is additionally illustrated in connection with the following Examples which are to be considered as illustrative of the present invention. It should be understood, however, that the invention is not limited to the specific details of the Examples.

EXAMPLES

A white ring of plastic material with an inner diameter of 7 mm and a height of 2 mm, which rests upon a microscopic-slide cover-glass, is filled up to the top and free of bubbles with a mixture comprising a monomer, polymerizable by ultraviolet light and, a benzilmonoketal, or a monomer, polymerizable by ultraviolet light, and a combination of benzilmonoketal with one of the above-listed phosphorous acid esters, respectively, and closed off with a microscopic-slide cover-glass. The ultraviolet-polymerization apparatus "Uviolite" which is manufactured by the ESPE Company and which preferably emits light ofthe wavelength $\lambda = 366$ nm was used as light source to accomplish the photopolymerization. The polymerization is started by placing the quartz rod of the apparatus, which serves as the conductor of the light, centrally and flatly upon the upper cover glass, thus irradiating the mass, polymerizable by ultraviolet light, through the cover glass from one side.

In the tables shown below the polymerization time $t_2$ (sec) denotes the time of irradiation where after removal of the cover glasses a pointed probe, subjected to a load of 100 g, could not penetrate any longer the rear side of the hardened layer of 2 mm thickness. In each example, the % by weight of the benzil derivative and phosphite are based on the amount of the photopolymerizable ester.

EXAMPLES 1 to 6

As the monomer, 2,2-bis-[p-(γ-hydroxypropoxy)-phenyl]-propanedimethacrylate (dimethacrylate I) was used, stabilized by the admixture of 200 ppm of p-methoxyphenol and 200 ppm of ionol.

TABLE I

| Ex. | Benzil derivative % by weight | Phosphite % by weight | Polymerization time in seconds |
|---|---|---|---|
| 1 | 0.5% of benzil-dimethylketal | — | $t_2 = 7$ |
| 2 | 0.5% of benzil-dimethylketal | 0.5% of didecyl-phenylphosphite | $t_2 = 2$ |
| 3 | 0.5% of benzil-dimethylketal | 0.5% of triethyl-phosphite | $t_2 = 3$ |
| 4 | 0.5% of benzil-dimethylketal | 1% of diphenyl-phosphite | $t_2 = 3$ |
| 5 | 0.5% of benzil-bis-β-methoxy-ethylketal | — | $t_2 = 7$ |
| 6 | 0.5% of enzil-bis-β-methoxy-ethylketal | 2% of didecyl-phenylphosphite | $t_2 = 3$ |

TABLE I-continued

EXAMPLES 7 and 8

The same dimethacrylate as in Examples 1 to 6 was used but the height of the specimen to be tested was raised to 3 mm, with the polymerization time $t_3$ being determined by the same method as described above.

TABLE II

| Ex. | Benzil derivative % by weight | Phosphite % by weight | Polymerization time in seconds |
|---|---|---|---|
| 7 | 0.25% of benzil-monoethyleneketal | — | $t_3 = 35$ |
| 8 | 0.25% of benzil-monoethyleneketal | 3% of didecyl-phenylphosphite | $t_3 = 18$ |

EXAMPLES 9 and 10

Pastes, produced by kneading 100 parts of dimethacrylate I, stabilized in the manner stated above, with 360 parts of silica with a grain size $<60\mu$ and colored to simulate teeth, were used.

TABLE III

| Ex. | Benzil derivative % by weight | Phosphite % by weight | Polymerization time in seconds |
|---|---|---|---|
| 9 | 1% of benzildi-methylketal. | — | $t_2 = 15$ |
| 10 | 1% of benzildi-methylketal | 2% of didecyl-phenylphosphite | $t_2 = 2$ |

EXAMPLES 11 to 14

Butanediol-1,4-dimethacrylate (described herein as Monomer B) and trimethylol-propane-trimethacrylate (described herein as Monomer T), respectively, both stabilized with 200 ppm of p-methoxyphenol, were used for these examples in place of the dimethacrylate I. In each instance 0.5% by weight of benzildimethylketal was admixed as an ultraviolet initiator.

TABLE IV

| Ex. | Monomer | Phosphite % by weight | Polymerization time in seconds |
|---|---|---|---|
| 11 | B | — | $t_2 = 32$ |
| 12 | B | 1.0% of triethyl-phosphite | $t_2 = 17$ |
| 13 | T | — | $t_2 = 20$ |
| 14 | T | 2.0% of didecyl-phenylphosphite | $t_2 = 9$ |

EXAMPLES 15 to 17

The hardening was carried out by the use of dimethacrylate I following the general procedures for photopolymerization as stated for the Examples 1 to 6 but with the difference that the rings of plastic material had an inner diameter of 7 mm and a height of 5 mm. The polymerization times $t_5$, found under these conditions, are listed in Table V below.

TABLE V

| Ex. | Benzil derivative % by weight | Phosphite % by weight | Polymerization time in seconds |
| --- | --- | --- | --- |
| 15 | 0.6% of benzil-methyl-ethylketal | — | $t_5 = 15$ |
| 16 | 0.6% of benzil-methyl-ethylketal | 0.5% of didecyl-phenylphosphite | $t_5 = 7$ |
| 17 | 0.5% of benzil-methyl-ethylketal | 0.5% of triethyl-phosphite | $t_5 = 6$ |

This Table demonstrates that even in case of a heavy thickness of the layer the admixture of a small quantity of phosphite in combination with a monoketal compound, as proposed by the present invention, causes a significant shortening of the polymerization time.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A photopolymerizable composition consisting essentially of acrylic or methacrylic acid esters which can be polymerized by ultraviolet light and which contain mono- or polyfunctional acrylic or methacrylic acid ester compounds and as ultraviolet initiators, a monoketal of an aromatic 1,2-diketone compound and from about 0.1 to about 20 percent by weight of the photopolymerizable ester compounds of an aliphatic, aromatic or mixed aliphatic-aromatic organic phosphite compound.

2. The photopolymerizable composition of claim 1, wherein the monoketals are present in an amount of from about 0.05 to 20 percent by weight of the photopolymerizable ester compound.

3. The photopolymerizable composition of claim 2, wherein the monoketals are present in an amount of from about 0.1 to 2 percent by weight of the photopolymerizable ester compound.

4. The photopolymerizable composition of claim 1, wherein the monoketal of an aromatic 1,2-diketone compound is benzildimethylketal.

5. The photopolymerizable composition of claim 1, wherein the phosphite is present in an amount of from about 0.2 to 2.0 percent by weight of the photopolymerizable ester compound.

6. The photopolymerizable composition of claim 3, wherein the phosphite is present in an amount of from about 0.2 to 2.0 percent by weight of the photopolymerizable ester compound.

7. The photopolymerizable composition of claim 1, wherein the said monoketal is derived from a monoalcohol.

8. The photopolymerizable composition of claim 1, wherein the said monoketal is derived from a dialcohol.

9. The photopolymerizable composition of claim 7, wherein the monoalcohol has from 1 to 10 carbon atoms.

10. The photopolymerizable composition of claim 9, wherein the monoalcohol has from 1 to 4 carbon atoms.

* * * * *